Dec. 17, 1963  J. J. CANTOR  3,114,382
BACKFLOW PREVENTING VALVE
Filed April 30, 1962  2 Sheets-Sheet 1

INVENTOR.
JACOB J. CANTOR
BY Lyon & Lyon
ATTORNEYS

Dec. 17, 1963  J. J. CANTOR  3,114,382
BACKFLOW PREVENTING VALVE
Filed April 30, 1962  2 Sheets-Sheet 2
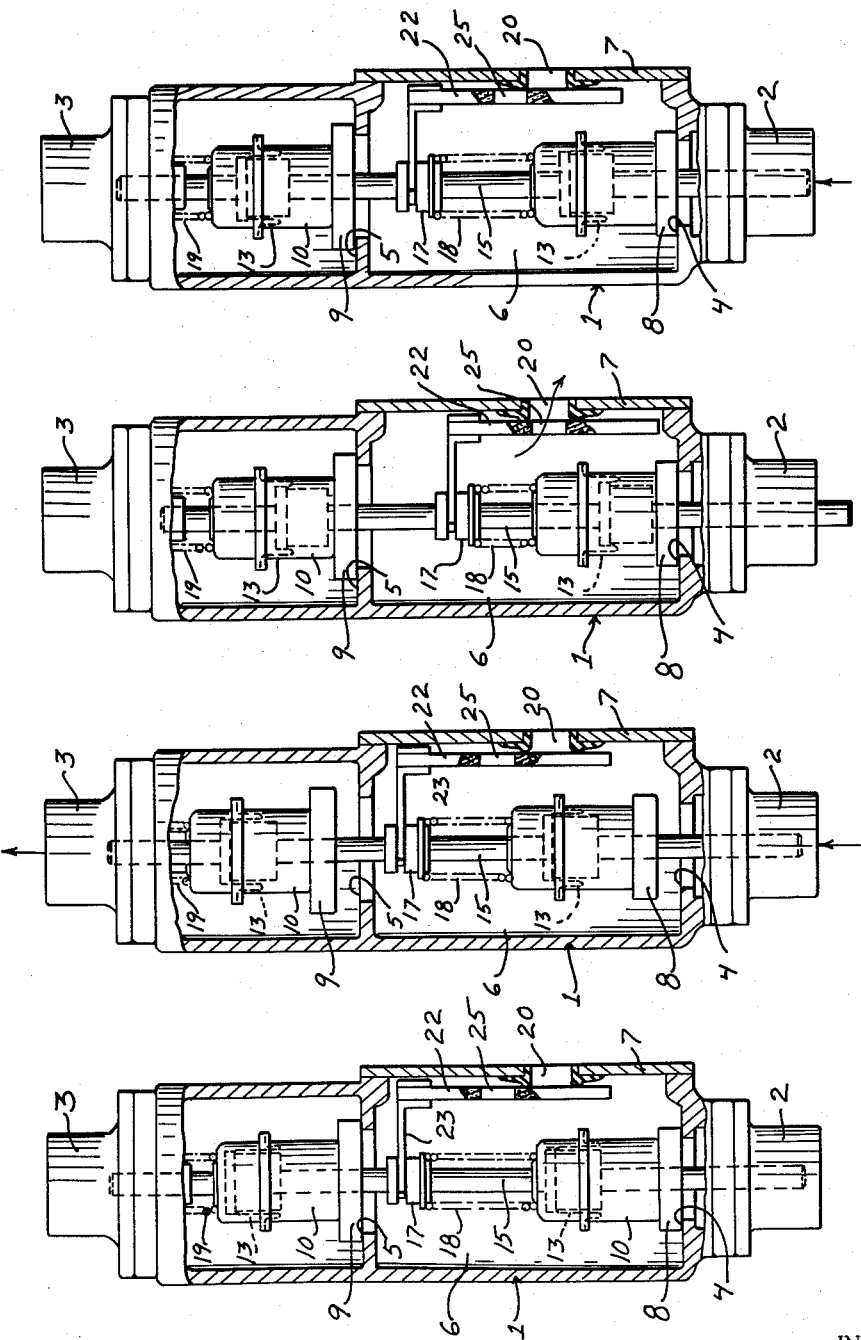
INVENTOR.
JACOB J. CANTOR
BY
ATTORNEYS

United States Patent Office 3,114,382
Patented Dec. 17, 1963

3,114,382
BACKFLOW PREVENTING VALVE
Jacob J. Cantor, 1905 Beverly Blvd., Los Angeles, Calif.;
Elva J. Karshner, executrix of said Jacob J. Cantor,
deceased
Filed Apr. 30, 1962, Ser. No. 191,086
8 Claims. (Cl. 137—116)

This invention relates to backflow preventing valve structure, and included in the objects of this invention are:

First, to provide a backflow preventing valve structure having a through passageway and control valves therein, which open as a function of downstream demand and also having a valve controlled side port or relief valve operative only in the event of drop in pressure at the upstream side of the valve to prevent backflow; the backflow preventing valve structure being so arranged that it operates in a normal manner for long periods of time without attention and with its relief valve closed, and yet may be depended upon not only to open the relief valve on failure of downstream pressure, but also to close when normal conditions are resumed, so as to minimize wastage of liquid.

Second, to provide a backflow preventing valve structure wherein normal flow of liquid therethrough maintains agitation of critical parts to prevent adhesion of these parts at the infrequent times of need.

Third, to provide a backflow preventing valve structure which does not require close tolerance in its manufacture and which is quickly and easily serviced or inspected.

Fourth, to provide backflow preventing valve structure which may be mounted in any desired position.

Fifth, to provide a backflow preventing valve structure wherein two valve units are mounted in tandem to define the ends of a side outlet valve chamber, the valve units having valve elements connected to a common shaft through novelly arranged rolling diaphragms which permit individual opening and closing of the valve elements as well as independent self-adjustment to their respective valve seats.

Sixth, to provide a backflow preventing valve structure which incorporates a novelly arranged slide valve operable in the event of upstream pressure failure to bypass backflowing water and to permit entrance of air so as to relieve vacuum pressures.

With the above and other objects in view, as may appear hereinafter, reference is directed to the accompanying drawings in which.

Figure 1:
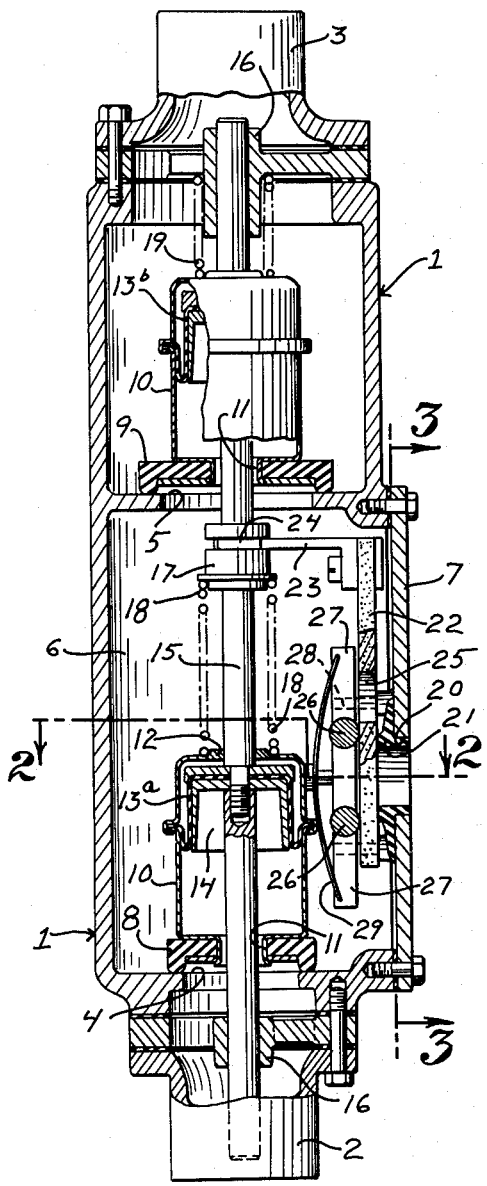
FIGURE 1 is a longitudinal sectional view through the backflow preventing valve with the valve shown in its closed position.
Figure 2:
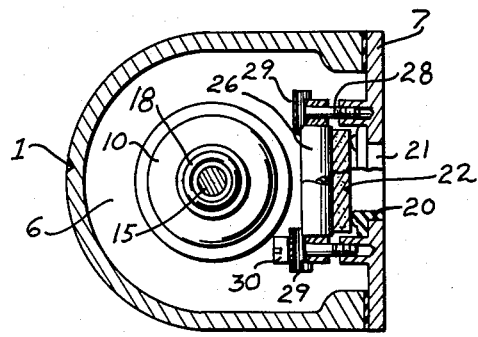
FIGURE 2 is a transverse sectional view taken principally through 2—2 of the FIGURE 1.
Figure 3:
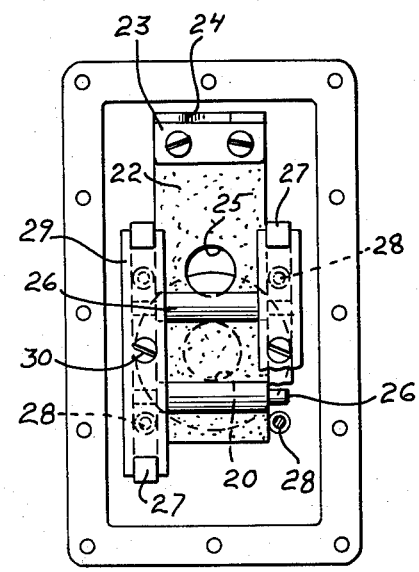
FIGURE 3 is an elevational view of the relief valve assembly as it appears removed from the backflow preventing valve, the view being taken in the direction of 3—3 of FIGURE 1.

FIGURES 4, 5, 6 and 7 are essentially diagrammatical views partially in section taken from the same aspect as FIGURE 1; FIGURE 4 showing the valve in its closed position under conditions of no flow; FIGURE 5 showing the valve in its open position under conditions of flow through the valve to the downstream side thereof; FIGURE 6 showing the valve under conditions of loss of upstream pressure in which the relief valve is open; and FIGURE 7 showing the valve in its transient condition as it moves from the position shown in FIGURE 6 to the position shown in FIGURE 5.

The valve includes an essentially cylindrical housing 1 having an inlet fitting 2 at its upstream end and an outlet fitting 3 at its downstream end. Formed within the housing near the inlet fitting 2 is an upstream valve seat 4 and disposed intermediate between the ends of the housing 1 is a downstream valve seat 5. The housing defines the valve seats 4 and 5, a relief valve chamber 6 having an opening in its side wall which is covered by a relief valve mounting plate 7.

The valve seats 4 and 5 are engaged respectively by an upstream valve element 8 and a downstream valve element 9. The downstream valve seat 5 is larger than the upstream valve seat 4, and the upstream valve element 8 is so dimensioned as to pass through the downstream valve seat. As a consequence, the valve elements and the assembly connected therewith, may be removed as a unit from the downstream end of the housing 1.

Mounted on the downstream side of each valve element is a diaphragm shell 10 which is cylindrical in form with a partially closed end to form an upstream port 11 extending through the corresponding valve element and a downstream port 12. Interposed between the ends of each diaphragm shell 10 is a rolling diaphragm 13, designated—13a in the downstream shell and 13b in the upstream shell. The central portion of the diaphragm is supported on a piston 14. The pistons and rolling diaphragms within the two diaphragm shells are interconnected by a sectional shaft 15. The extremities of the shaft 15 are guided by spiders 16 located at the inlet and outlet ends of the housing 1.

A collar 17 for operating the relief valve is mounted on the shaft 15 downstream of the upstream valve element 8 and its diaphragm shell 10. A spring 18 is interposed between this shell and the collar 17 so as to urge the upstream valve element 8 against its seat. A second spring 19 is interposed between the downstream diaphragm shell and the guide spider 16 at the downstream or outlet end of the housing 1.

The relief valve mounting plate 7 is provided with a laterally opening relief valve port 20 in which is fitted a yieldable seat member 21 facing into the relief valve chamber 6. The relief valve seat member 21 is adapted to be engaged by a slide plate 22 which moves in a path parallel with the sectional shaft 15 and is connected to the collar 17 by a bracket 23 terminating in a yoke 24. The slide plate 22 is provided with a port 25 movably into and out of registry with the relief valve port 20.

The relief valve slide plate is held in sealing engagement with the seat member 21 by means of backing rollers 26, the ends of which are journaled in parallel bars 27. The bars 27 are limited to movement to and from the relief valve mounting plate 7 by means of guide pins 28. Each bar 27 is bridged by an arcuate leaf spring 29, the center of which is engaged by the head of screw 30 joined to the relief valve mounting plate 7. The extremities of the leaf springs 20 bear against the bars 27 so that the bars in turn force the backing rollers 26 against the backside of the slide plate 22. The slide plate is preferably formed of graphite or a graphite metal mixture so as to provide a surface having an extremely low coefficient of friction. In addition, the valve seat member 21 may be formed of rubber or of Teflon, the latter providing a low coefficient of friction.

Operation of the backflow preventing valve is as follows:

The backflow preventing valve is installed between a water supply line and a water distributing system having one or many outlets. Under normal static conditions when the outlets are closed water pressure in the supply line and the distributing system is equalized, that is, pressure upstream and downstream of the backflow preventing valve are equal. Under this condition the parts of the valve are in the positions shown in FIGURE 4; that is, both elements 8 and 9 are seated and the spring 18 acting between casing 10 and collar 17 holds the shaft 15 in a downstream position so that the relief valve is closed.

When an outlet or outlets downstream of the valve are opened water flows in the direction of the arrow in FIGURE 5 lifting the valve elements 8 and 9 from their respective seats. The force exerted through yoke 24 on bracket 23 and hence on the relief valve slide plate 22 is such that relief valve slide plate 22 remains in a downstream position so that the relief valve remains closed. The displacements of the valve elements 8 and 9 from their respective seats 4 and 5 fluctuate as a function of the rate of flow through the valve in a downstream direction.

Should there be a partial or full failure of pressure at the normally upstream side of the backflow preventing valve, the excess pressure at the normally downstream side thereof causes the valve elements 8 and 9 to seat, and in addition, this pressure acts on rolling diaphragm 13a to urge the sectional shaft 15 in an upstream direction against the action of the spring 18 so as to move the relief valve slide plate 22 in an upstream direction and bring the port 25 into registry with the port 20 as shown in FIGURE 6. It will be noted that the relief valves bleeds water from the relief valve chamber and bleeds any water that may leak through the normally downstream valve element 9. A leakage of this valve is not likely to occur so that pressure in the system downstream of the valve is maintained unless an outlet should be opened.

When pressure upstream of the backflow preventing valve is restored, a resulting force on rolling diaphragm 13b causes diaphragm 13b and the attached shaft 15 to move in a downstream direction before the valve elements 8 and 9 unseat. This movement of shaft 15 is transmitted through yoke 24 and bracket 23 to cause the relief valve slide plate 22 to move in a downstream direction, and thus to close the relief valve port 20 immediately before the valve elements 8 and 9 open. This initial movement of the rolling diaphragms and shaft, before opening of the valve elements 8 and 9, is indicated in FIGURE 7.

It will be noted that the relief valve is automatically closed before normal flow is restored; that is the relief valve automatically resets itself. Also it will be noted that there is a minimum loss of liquid from this system although the relief valve opens and performs its function when needed.

It should also be noted that during the conditions of normal operation the parts of the backflow preventing valve move in response to and as a function of the rate of flow therethrough, and that the flow produces some agitation or movement of the relief valve slide plate without opening the relief valve. As a consequence of this constant movement the backflow preventing valve including the relief valve do not become frozen but remain ready at all times to function even when failure of upstream pressure is a relatively rare event.

While what hereinbefore has been described as the preferred embodiment of this invention, it is readily apparent that alterations and modifications may be resorted to without departing from the scope of this invention and such alterations and modifications are intended to be included within the scope of the appended claims.

I claim:
1. A backflow preventing valve structure, comprising:
 (a) a valve housing having tandemly disposed valve seats and defining therebetween a relief valve chamber;
 (b) a valve unit for each valve seat each including a valve element engageable with its respective seat and adapted to open in response to upstream pressure, a diaphragm shell carried by said valve element and a diaphragm dividing said shell into an upstream connected side and a downstream connected side;
 (c) a stem interconnecting said diaphragms;
 (d) and a relief valve in said relief valve chamber including a valve port and a valve element;
 (e) and means connecting the valve element of said relief valve with said stem;
 (f) said diaphragms being responsive to upstream pressure to urge said relief valve to its closed position and responsive to downstream pressure to open said relief valve.

2. A backflow preventing valve structure, comprising:
 (a) a valve housing having tandemly disposed valve seats and defining therebetween a relief valve chamber;
 (b) a valve unit for each valve seat each including a valve element engageable with its respective seat and adapted to open in response to upstream pressure, a diaphragm shell carried by said valve element and a diaphragm dividing said shell into an upstream connected side and a downstream connected side;
 (c) a stem interconnecting said diaphragms;
 (d) a relief valve port and seat in a side wall of said relief valve chamber;
 (e) a slide valve covering said port and having an aperture movable laterally between a registering position and a nonregistering position relative to said port;
 (f) and means connecting said slide valve with said stem;
 (g) said diaphragms being responsive to upstream pressure to urge the aperture of said slide into its nonregistering position, and responsive to downstream pressure to urge the aperture of said slide valve into its registering position.

3. A backflow preventing valve structure, comprising:
 (a) a valve housing having an inlet port, an outlet port, and a relief valve chamber therebetween;
 (b) a check valve element for each of said ports positioned to open in response to pressure upstream of its respective port;
 (c) a stem disposed in coaxial relation to said check valve elements;
 (d) a diaphragm connecting each check valve element with said stem, each diaphragm being responsive to pressure upstream thereof to move stem in a downstream direction and conversely responsive to downstream pressure to move said stem in an upstream direction;
 (e) and a relief valve in said relief valve chamber and connected with said stem for movement between an open position, when said stem is in its downstream position, and a closed position when said stem is in its upstream position.

4. A backflow preventing valve structure, comprising:
 (a) a valve housing having an inlet port, an outlet port, and a relief valve chamber therebetween;
 (b) a check valve element for each of said ports positioned to open in response to pressure upstream of its respective port;
 (c) a stem disposed in coaxial relation to said check valve elements;
 (d) a diaphragm connecting each check valve element with said stem, each diaphragm being responsive to pressure upstream thereof to move said stem in a downstream direction and conversely responsive to downstream pressure to move said stem in an upstream direction;
 (e) a relief valve port in a side wall of said relief valve chamber;
 (f) and a slide valve connected with said stem and moveable laterally across said relief valve port between a closed position when said stem is in its downstream position, and an open position, when said stem is in its upstream position.

5. A backflow preventing valve structure, comprising:
 (a) a valve seat disposed in a liquid supply line;

(b) a check valve element engageable with said valve seat;

(c) a diaphragm shell carried by said valve element the ends of said shell communicating with the upstream and downstream sides of said valve element;

(d) a diaphragm supported in said shell;

(e) a shaft carried by said diaphragm for axial movement relative to said valve element;

(f) yieldable means tending to maintain said shaft in one axial position with respect to said shell to permit opening and closing of said check valve in response to downstream flow and to static pressure conditions in said supply line;

(g) and a relief valve downstream of said valve seat operatively connected to said shaft, said shaft normally holding said relief valve in its closed position;

(h) said shaft and diaphragm being responsive to loss of pressure upstream of said valve seat to move said relief valve to its open position.

6. A backflow preventing valve structure, comprising:

(a) means defining a relief valve chamber disposed in a liquid supply line;

(b) a relief valve in said chamber for discharging liquid from said supply line;

(c) a pair of check valves disposed in tandem upstream and downstream of said chamber for permitting downstream flow of liquid through said chamber, but preventing backflow to and from said chamber;

(d) a pair of diaphragms disposed in tandem, the proximal sides thereof being exposed to said chamber and the distal sides thereof being exposed respectively downstream and upstream of said chamber;

(e) an operating shaft common to said diaphragms and connected with said relief valve and responsive to a greater pressure upstream of either of said diaphragms to close said relief valve and a greater pressure downstream of either of said diaphragms to open said relief valve.

7. A backflow valve structure, comprising:

(a) means defining a relief valve chamber having an inlet and an outlet, and a discharge port between said inlet and outlet;

(b) check valves for said inlet and outlet to prevent backflow from said outlet through said inlet;

(c) a relief valve for said discharge port;

(d) a first diaphragm and housing defining a first chamber communicating with a region downstream with respect to said inlet;

(e) a second diaphragm and housing defining a second chamber communicating with a region upstream with respect to said outlet;

(f) and mechanical means interconnecting said diaphragms and relief valve for closing said discharge port, when the pressure downstream of said inlet exceeds the pressure upstream of said outlet, and for opening said discharge port, when the pressure upstream of said outlet exceeds the pressure downstream of said inlet.

8. A backflow valve structure, comprising:

(a) downstream and upstream check valves disposed in a liquid supply line and positioned to prevent backflow into said supply line;

(b) a relief valve disposed between said check valves;

(c) a downstream diaphragm and housing forming a chamber communicating with said supply line downstream of said downstream check valve;

(d) an upstream diaphragm and housing forming a chamber communicating with said supply line upstream of said upstream check valve;

(e) and means interconnecting said diaphragms and relief valve to open said relief valve, when the pressure in said supply line downstream of said downstream check valve exceeds the pressure upstream of said upstream check valve, and to close said relief valve, when the pressure in said supply line upstream of said upstream check valve exceeds the pressure downstream of said downstream check valve.

References Cited in the file of this patent
UNITED STATES PATENTS

| | | |
|---|---|---|
| 2,586,942 | Grove | Feb. 26, 1952 |
| 2,897,835 | Philippe | Aug. 4, 1959 |